Nov. 24, 1959  F. E. VANDERWAL, JR  2,914,265
FILM WINDING DEVICE FOR PROJECTORS
Filed Oct. 14, 1957  2 Sheets-Sheet 1
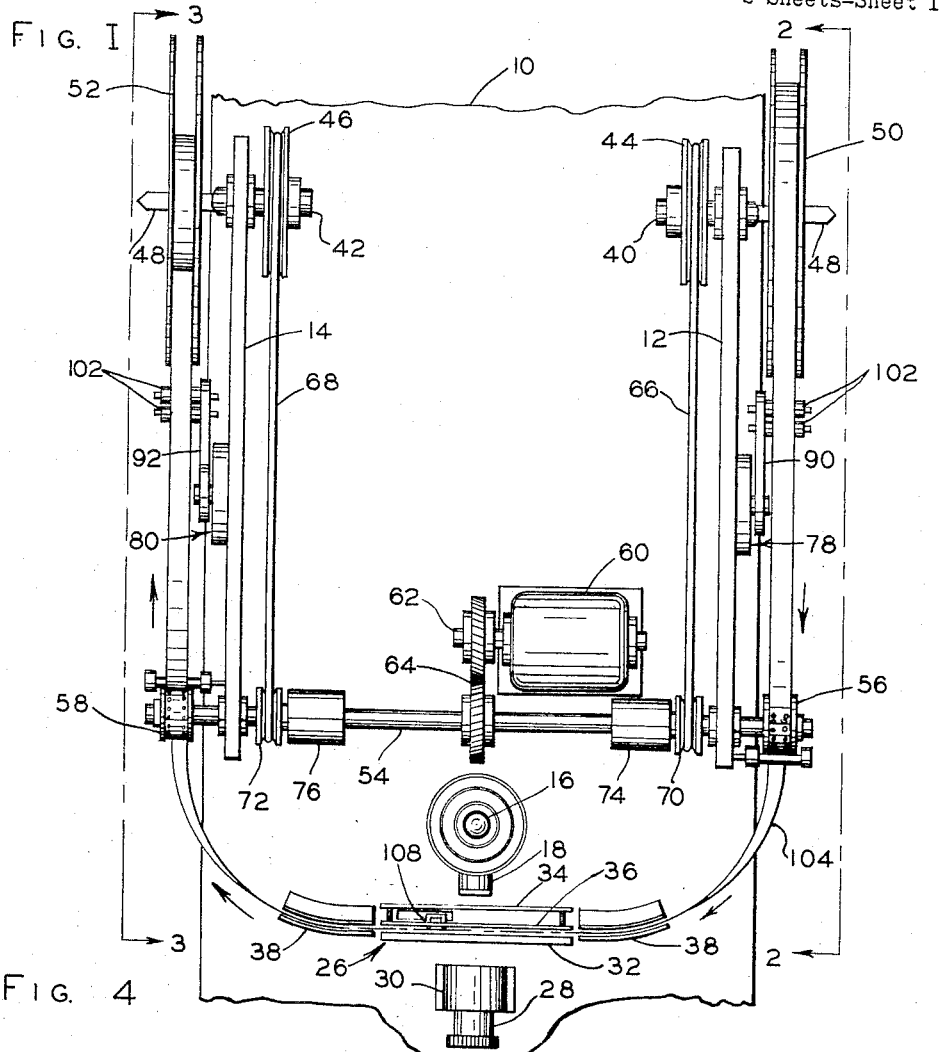
FIG. I
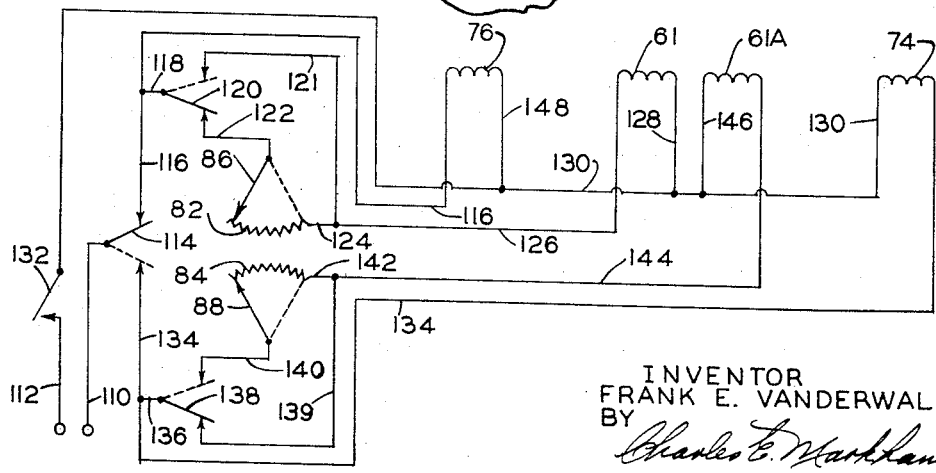
FIG. 4
INVENTOR
FRANK E. VANDERWAL JR.
BY
Charles E. Markham
HIS AGENT Nov. 24, 1959   F. E. VANDERWAL, JR   2,914,265
FILM WINDING DEVICE FOR PROJECTORS
Filed Oct. 14, 1957                           2 Sheets-Sheet 2

INVENTOR
FRANK E. VANDERWAL JR.
BY
HIS AGENT

United States Patent Office 2,914,265
Patented Nov. 24, 1959

2,914,265

FILM WINDING DEVICE FOR PROJECTORS

Frank E. Vanderwal, Jr., St. Louis, Mo., assignor to White-Rodgers Company, St. Louis, Mo., a corporation of Delaware Application October 14, 1957, Serial No. 689,815

4 Claims. (Cl. 242—55.12)

This invention relates to film winding mechanism for use in projectors having intermittent motion, film feeding mechanisms which are designed to feed a film strip frame by frame through the projection aperture in either direction and at various rates. The device, while having other utility, is particularly adapted for use with film feeding mechanism of the kind shown and described in the commonly-owned, copending applications of Eric E. Kropp et al., Serial No. 578,034, filed April 13, 1956, for "Visual Training Projector," and of Clifford B. Boehmer et al., Serial No. 625,513, filed November 30, 1956, for "Film Feeding Mechanism."

In the film feeding mechanims disclosed in the above applications, a film engaging claw arm or shuttle reciprocates at constant speed parallel to the film strip and is normally disengaged from the film strip. In order to feed the film, the claw is moved laterally into engagement with the film during a forward stroke, whereby it feeds the film strip one frame. The film may, therefore, be fed frame by frame at various rates by effecting engagement of the normally free-running claw arm intermittently with respect to its constant cyclic rate and at a selected frequency. For example, if engagement of the claw with the film strip during its forward stroke is effected every third cycle of its reciprocation, then the film strip will be fed through the projection aperture frame by frame at one-third the cyclic rate of the claw arm and so on, with the maximum feeding rate occurring when the claw is engaged at every forward stroke. In the latter of the above-mentioned patent applications, the shuttle-type feed mechanism is arranged to feed the film frame by frame in either direction.

From the foregoing it will be apparent that a film winding mechanism for use in connection with either of the above variable rate, film feeding mechanisms, which will transfer film from one storage reel to another in accordance with the rate at which the film is being fed, can not be directly driven in the usual manner by the driving means which drives the film feeding claw. It can, however, be intermittently connected to the constant speed, claw driving means by a clutch, or the like, in phase with the engagement of the claw arm with the film, or it can be driven by an intermittently operated prime mover, such as a solenoid, which could be energized and would effect a predetermined movement of the winding mechanism each time the claw is engaged to feed the film one stroke.

The abrupt starting and stopping of the winding mechanism by clutching and declutching, or by a solenoid actuator, is quite undesirable, however, chiefly because of the considerable mass of the storage reels and the film thereon in addition to other mechanism which must be started and stopped at relatively high frequency.

In the present invention it is the primary object to provide a novel and reliable film winding device which will transfer film from a first to a second storage reel, or vice versa, in accordance with the direction and the rate at which an independently driven, variable rate, film feeding mechanism is feeding film through the projection aperture, and which will maintain a substantially constant light tension on the film strip at both ends of the film guide irrespective of which direction the film is being fed.

A further object is to provide a film winding device which operates concurrently with a variable rate, intermittent motion, film feeding device to unwind film from one storage reel and wind it on another in accordance with the rate at which the film feeding device is feeding film through the projection aperture, and which is driven by independent, variable speed, driving means under the control of tension sensitive means.

Further objects and advantages will appear from the following description when read in connection with the accompanying drawings.

In the drawings:

Fig. 1 is a partial plan view of a film projector showing a film winding device, constructed in accordance with the present invention, mounted thereon;

Fig. 4 is a diagrammatic view of the control system for operating the film winding device.

Figure 2:
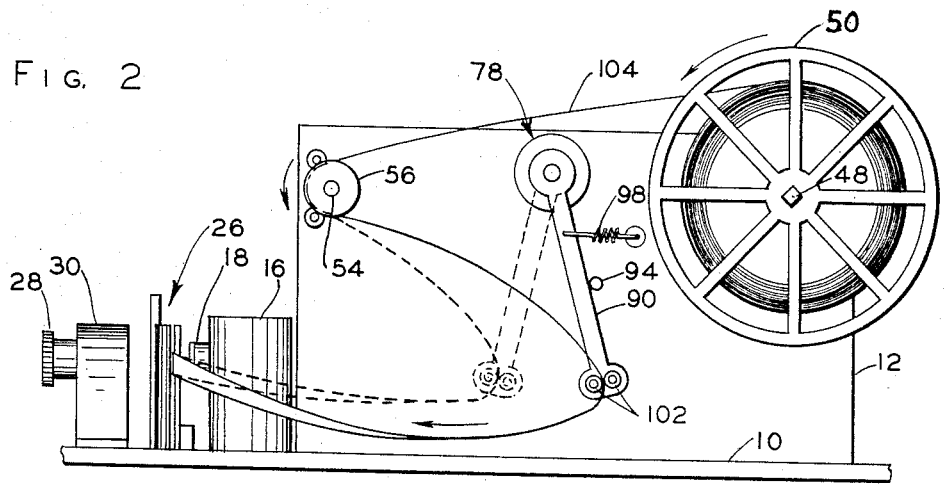
Fig. 2 is a right side elevational view of the device shown in Fig. 1, and is taken along line 2—2 of Fig. 1.

Referring to the drawings in more detail, a horizontal plate member is indicated in part at 10, having a pair of vertical plates 12 and 14 extending along opposite sides thereof and attached thereto as by welding or other suitable means. The horizontal plate 10 may form the top side of a projector casing which encloses the usual driving means for the film feeding mechanism and blower means for supplying cooling air (not shown). The plate 10 supports on its upper surface other essential elements of the projector, such as a lamp 16, a condensing lens 18, film guide means generally indicated at 26, and an objective lens 28 mounted in a lens mount 30.

The film guide means includes a horizontally channeled, film guide plate 32, a hinged film gate 34 which carries a pressure plate 36 for holding the film flat against the guide plate, and a pair of curved film channels 38, one at each end of the horizontal film guide plate. The film guide plate and the film gate are provided with rectangular apertures in axial alignment with the optical axes of the lenses. Journalled for rotation in the vertical plates 12 and 14 are short shafts 40 and 42, respectively. Shaft 40 carries keyed to one end thereof a pulley 44, and shaft 42 carries keyed to one end thereof a pulley 46. At their other ends the shafts 40 and 42 are square in cross-section, as indicated at 48, for the quick, detachable mounting of film storage reels 50 and 52, which have square holes through their hubs for receiving the shafts.

Also journalled in the vertical plates 12 and 14 is a long shaft 54, which projects at both ends beyond the vertical plates and has keyed to one projecting end thereof a sprocket 56 and to the other projecting end thereof a sprocket 58. The shaft 54 is driven by a variable speed, reversible, electric motor 60 through gears 62 and 64, and short shafts 40 and 42, which carry the film storage reels, are selectively driven by the shaft 54 through belts 66 and 68, which extend over pulleys 70 and 72 on driving shaft 54 and over pulleys 44 and 46 on short shafts 40 and 42. The pulleys 70 and 72 are normally free to turn on driving shaft 54, but each is caused to turn with the shaft when its respective adjacent electromagnetic clutch 74 or 76 is energized. The electromagnetic clutches 74 and 76 turn with the driving shaft 54 and are alternately energized in a manner to be described, thereby to effect the winding of film on one or the other of the storage reels 50 and 52.

The variable speed, reversible motor 60 is provided with field windings 61 and 61a, see Fig. 4. Energization of winding 61 causes the motor to turn in a direction to rotate shaft 54 and sprocket 56 in a counterclockwise direction with respect to Fig. 2, thereby to unwind film from reel 50, while energization of field winding 61a causes motor 60 to turn in the opposite direction to turn sprocket 58 in a counterclockwise direction with respect to Fig. 3, thereby to unwind film from reel 52. The speed at which film is wound and unwound in either direction is directly proportionate to the speed of motor 60, and the speed of motor 60 is varied by varying the resistance of the field windings 61 and 61a in accordance with the rate at which the film is being fed through the aperture by the film feeding means. This is accomplished by a pair of film tension-sensitive devices generally indicated at 78 and 80.

Figure 3:
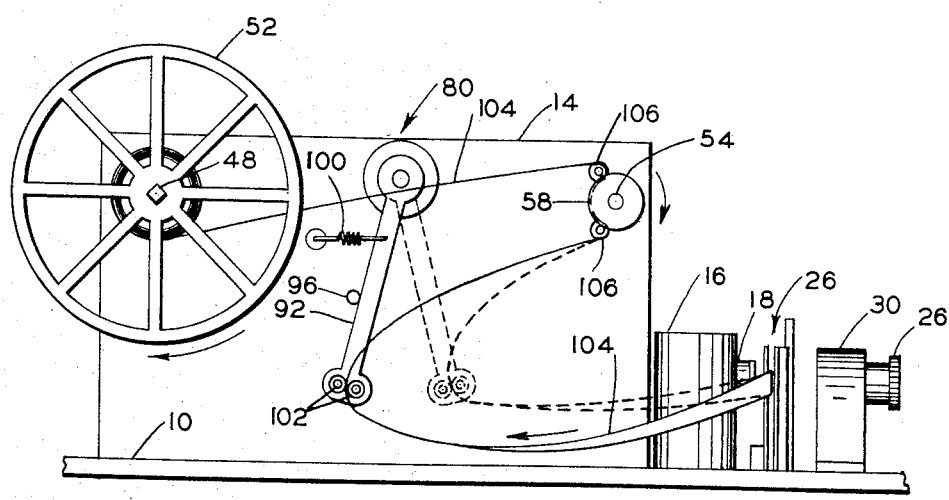
Fig. 3 is a left side elevational view of the device shown in Fig. 1, and is taken along line 3—3 of Fig. 1.

The devices 78 and 80 consist of arcuately arranged resistors 82 and 84, respectively, and pivoted shorting bars 86 and 88, respectively, see Fig. 4, which pivoted shorting bars are connected to and move with arms 90 and 92, respectively. The arms 90 and 92, shown in Figs. 2 and 3, are pivoted on the same centers as the shorting bars 86 and 88, shown in Fig. 4. The arms 90 and 92 are biased in one rotational direction against limit stops 94 and 96, respectively, by relatively soft springs 98 and 100, respectively. The outer free ends of arms 90 and 92 are provided with closely spaced rollers 102.

A film strip indicated at 104 is shown extending from the storage reel 50 to driving sprocket 56, around the driving sprocket 56 to the free end of arm 90 where it passes between the closely spaced rollers 102, thence to the film guide means 26, through the film guide means 26 to the free end of arm 92 where it passes between roller 102 at the free end of arm 92, thence to sprocket 58 where it is held in mesh with the sprocket teeth by a pair of rollers 106, and finally to film storage reel 52. The film may be fed frame by frame for projection through the film guide means 26 in one direction or the other, at various rates, by any suitable means, as for example, by the intermittent motion mechanism shown and described in the abovementioned, copending applications, both of which include a normally free-running, reciprocating claw element as indicated at 108 in Fig. 1.

Referring to the diagram, Fig. 4, a pair of leads 110 and 112 are provided for connection to a suitable power source which in this case may be 110 volt alternating current. The circuit for energization of motor field winding 61 may be traced as follows: from one power source terminal through lead 110, through a double-throw switch 114 (in full line position), a lead 116, a lead 118, through double-throw switch 120 (in full line position), a lead 122, the pivoted shorting arm 86 and resistor 82, a lead 124, a lead 126, field winding 61, a lead 128, a lead 130, a line switch 132, and lead 112 to the other power source terminal. A shunt around resistor 82 is also provided when switch 120 is in its dotted line position, consisting of switch blade 120 and a lead 121.

The circuit for energizing field winding 61a may be traced from one power source terminal through the lead 110, double-throw switch 114 (when in its dotted line position), a lead 134, a lead 136, a double-throw switch 138 (in its dotted line position), a lead 140, the shorting arm 88, resistor 84, a lead 142, a lead 144, field winding 61a a lead 146, through common return 130, line switch 132, and lead 112 to the other power source terminal. A shunt around resistor 84 is also provided when switch 138 is in its solid line position, consisting of switch blade 138 and a lead 139.

The circuit for energizing the winding of electromagnetic clutch 74 may be traced as follows: from one power source terminal through lead 110, double-throw switch 114 (in dotted line position), lead 134, the winding 74, lead 130, line switch 132, and lead 112 to the other power source terminal. The winding for electromagnetic clutch 76 may be traced from one power source through lead 110, through double-throw switch 114 (in full line position), lead 116, winding 76, a lead 148, lead 130, line switch 132, and lead 112 to the other power source terminal.

*Operation*

The switches 114 and 120 are shown in a position which will effect the unwinding of film from reel 50, and the rewinding of film on reel 52, in accordance with the rate at which the film is being fed through the guide 26 by claw arm 108 in a forward direction or in a direction from right to left, as indicated by arrows in Fig. 1. When line switch 132 is closed under these conditions, motor winding 61 and electromagnetic clutch 76 will be energized. The film is threaded so that the loop between sprocket 56 and the film guide is slack enough to permit arm 90 to rest against its stop 94, wherein the entire resistance 82 is in series with field winding 61, as shown in Fig. 4, and the motor 60 is inoperative. The range of resistance variation of resistors 82 and 84 is such that the motor is inoperative when the full length of either of these resistors is in series with a field winding and operates at full power when these resistors are shorted out.

If film is now fed forward in the direction of the arrows by claw 108, the slack in the aforementioned loop will be picked up and arm 90 will be slowly rotated clockwise, effecting a gradual reduction in field resistance so that motor 60 begins to drive the sprocket 56, thereby pulling film from reel 50 to maintain the loop. As the feeding rate by the claw arm is increased, the arm 90 responds to further reduce field resistance and the motor 60 drives the sprocket 56 faster, and, of course, as the feeding rate is reduced, the arm 90 will be rotated counterclockwise by spring 98 to reduce the speed of motor 60. At the same time this is occurring sprocket 58 is picking up film from the other end of the film guide at the same rate, and electromagnetic clutch 76, being energized through switch 114, effects the driving of reel 52 through pulleys 72 and 46 and belt 68 to rewind the film. It is to be understood that the clutching of pulleys 70 and 72 to drive shaft 54 by the electromagnetic actuators 74 and 76 is not positive and that slippage occurs to accommodate the differential rates at which the film reels rotate as the film is wound or unwound.

When the direction of film feeding by claw arm 108 is reversed, switches 114 and 138 are moved from their full line to dotted line positions. This effects energization of motor winding 61a and electromagnetic clutch actuator 74 through the described circuits, whereby the film is now unwound from reel 52 under control of arm 92 of tension sensitive device 80 and is rewound on reel 50 due to energization of electromagnetic clutch 74 in a manner similar to that just described. The biasing springs 98 and 100 for arms 90 and 92 may be long, soft springs with little change in rate through their working range so that a substantially constant light tension is maintained in the film strip between the arms and the ends of the film guide.

When it is desired to rewind the film from one reel to the other at full speed, switch 120 or switch 138, as the case may be, is moved to a position to shunt its respective variable resistor. For example, if after feeding and winding the film in a forward direction, as indicated by the arrows, it is desired to rewind the film on reel 50 at full motor speed, then switch 114 is moved from its full to its dotted line position, and switch 138 is placed in its full line position, wherein it completes a shunt around resistor 84 for the full energization of reverse motor winding 61a. Sprockets 56 and 58 will thereby be driven in a reverse direction at full speed, and reel 50 will be driven counterclockwise at full speed. Full speed rewind is effected in a forward direction by placing switch 114 in a full line position and switch 120 in its dotted line position, wherein it completes a shunt around variable resistor 82 to fully energize forward field winding 61.

It will be seen from the foregoing that I have provided a film winding mechanism which will accelerate and decelerate smoothly to unwind and rewind film in either direction in accordance with the direction and rate at which film is being fed through the projection aperture by independently driven film feeding means, while maintaining a substantially constant, light tension on the film strip at both sides of the film feeding mechanism.

The description and accompanying drawings are intended to be illustrative and not limiting, the scope of the invention being set forth in the appended claims.

I claim:

1. In a strip film projector having a film feeding device of the type which feeds film through the projection aperture frame by frame at various selected rates and in either direction, and which includes a film storage device on each side of the film feeding device; a film driving element between each film storage device and the film feeding device, a reversible, variable speed, driving means for selectively driving both film driving elements at the same speed in one direction or the other, a tensioned member on each side of the film feeding device, each of said tensioned members being biased against a film strip being projected at a point between the film feeding device and one of said film driving elements, thereby to form a loop of varying length depending upon the tension of the film strip at that point, a control member movable with each of said tensioned elements for controlling the speed of said variable speed driving means, and switching means for controlling the direction of operation of said variable speed driving means and for switching the control of said variable speed driving means from one of said control members to the other depending upon which direction the film strip is being fed.

2. Mechanism for unwinding film strip from one film storage reel and winding it on another, or vice versa, according to the direction in which the film is being fed for projection by a reversible film feeding device between the two reels, said mechanism including a driving shaft, a reversible electric motor for driving said driving shaft, a pair of driven shafts each of which is arranged for mounting a film storage reel on one end thereof for rotation therewith, a pulley keyed on each of said driven shafts, a pair of pulleys mounted for rotation on said driving shaft, a pair of driving belts for connecting each of said pulleys on said driven shafts with one of said pair of pulleys on said driving shaft, a pair of electromagnetic clutching devices each of which when energized frictionally connects one of said pulleys on said driving shaft for rotation with said driving shaft, an energizing circuit for said motor and said electromagnetic clutches, and switching means in said circuit having a first position for effecting the operation of said motor in one direction and for energizing one of said electromagnetic clutches and having a second position for effecting the operation of said motor in an opposite direction and for energizing the other of said electromagnetic clutches.

3. Mechanism for unwinding film from one film storage reel and rewinding it on another, or vice versa, and at various speeds, in accordance with the direction and speed at which the film strip is being fed through the projection aperture of a film projector by a reversible, intermittent motion, film indexing device located between the two storage reels; said mechanism including a driving shaft, a reversible, variable speed, electric motor for driving said driving shaft, a pair of driven shafts, each being arranged for mounting a film storage reel on one end thereof for rotation therewith, a pair of electromagnetic clutching devices, each of which when energized effects a frictional driving connection between said driving shaft and one of said driven shafts, a pair of sprocket wheels driven by said driving shaft, said sprocket wheels being arranged to drivably engage a film strip at points lying on opposite sides of the intermittent motion, film indexing device, whereby the sprocket wheels alternately pull film from a storage reel or take up film from the film indexing device, depending upon which direction the driving shaft is turning in correspondence with the direction in which the indexing device is feeding, a branched energizing circuit for energizing said motor and said electromagnetic actuators, one of said circuit branches, when completed, being arranged to effect operation of said motor in one direction and to energize one of said electromagnetic clutches, the other of said circuit branches, when completed, being arranged to effect operation of said motor in the opposite direction and to energize the other of said electromagnetic clutches, said circuit branches each including a variable resistor for varying the speed at which said motor operates, a movably mounted, tension sensitive element operatively connected to each of said variable resistors, said tension sensitive elements each being biased against the film strip being projected at points lying on opposite sides of the film indexing device and between the film indexing device and said sprocket wheels, whereby a change in the tension of the film strip portions between either of said sprocket wheels and the film feeding device effects movement of said tension sensitive elements, and switching means for selectively connecting one or the other of said circuit branches across a source of electrical power.

4. A film winding mechanism, as set forth in claim 3, which is further characterized by means including a switch in each of said branch circuits for selectively shunting the variable resistor, whereby a film strip may be transferred from one storage reel to another in either direction at full motor speed as when rewinding a film strip after projection.

References Cited in the file of this patent
UNITED STATES PATENTS

| | | |
|---|---|---|
| 2,645,478 | Moore et al. | July 14, 1953 |
| 2,656,129 | De Turk et al. | Oct. 20, 1953 |
| 2,814,676 | House | Nov. 26, 1957 |